US012626903B2

(12) United States Patent
Kim et al.

(10) Patent No.: US 12,626,903 B2
(45) **Date of Patent: \*May 12, 2026**

(54) CATHODE ACTIVE MATERIAL FOR LITHIUM SECONDARY BATTERY AND METHOD OF MANUFACTURING THE SAME

(71) Applicant: SK On Co., Ltd., Seoul (KR)

(72) Inventors: Sang Bok Kim, Daejeon (KR); Ji Hoon Choi, Daejeon (KR); Jik Soo Kim, Daejeon (KR); Mi Jung Noh, Daejeon (KR); Dong Il Jang, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 85 days.

This patent is subject to a terminal disclaimer.

(21) Appl. No.: 18/538,239

(22) Filed: Dec. 13, 2023

(65) Prior Publication Data

US 2024/0113277 A1 Apr. 4, 2024

Related U.S. Application Data

(63) Continuation of application No. 17/014,314, filed on Sep. 8, 2020, now Pat. No. 11,888,102.

(30) Foreign Application Priority Data

Sep. 9, 2019 (KR) ........................ 10-2019-0111483

(51) Int. Cl.
| | |
|---|---|
| *H01M 4/131* | (2010.01) |
| *H01M 4/04* | (2006.01) |
| *H01M 4/1391* | (2010.01) |
| *H01M 4/36* | (2006.01) |
| *H01M 4/505* | (2010.01) |
| *H01M 4/525* | (2010.01) |
| *H01M 10/0525* | (2010.01) |

(52) U.S. Cl.
CPC ......... *H01M 4/131* (2013.01); *H01M 4/0471* (2013.01); *H01M 4/1391* (2013.01); *H01M*

*4/366* (2013.01); *H01M 4/505* (2013.01); *H01M 4/525* (2013.01); *H01M 10/0525* (2013.01)

(58) Field of Classification Search
CPC ...................................................... H01M 4/131
See application file for complete search history.

(56) References Cited

U.S. PATENT DOCUMENTS

| | | | |
|---|---|---|---|
| 10,535,873 | B2 | 1/2020 | Lee et al. |
| 2012/0177994 | A1 | 7/2012 | Kim et al. |
| 2015/0108397 | A1 | 4/2015 | Takeoka et al. |
| 2016/0013476 | A1 | 1/2016 | Oh et al. |
| 2017/0352885 | A1 | 12/2017 | Kondo et al. |
| 2019/0165360 | A1 | 5/2019 | Saruwatari et al. |
| 2020/0381719 | A1 | 12/2020 | Park et al. |
| 2021/0234164 | A1 | 7/2021 | Jung et al. |

FOREIGN PATENT DOCUMENTS

| | | |
|---|---|---|
| CN | 105070908 A | 11/2015 |
| CN | 108832103 A | 11/2018 |
| CN | 108899502 A | 11/2018 |
| CN | 109428077 A | 3/2019 |
| CN | 109802123 A | 5/2019 |
| CN | 110085814 A | 8/2019 |
| CN | 110114149 A | 8/2019 |
| JP | 2016216340 A | 12/2016 |
| KR | 100821523 B1 | 4/2008 |
| KR | 101718668 B1 | 3/2017 |
| KR | 101898240 B1 | 7/2017 |
| KR | 1020170076222 A | 7/2017 |
| KR | 1020170080483 A | 7/2017 |
| KR | 1020170103699 | 9/2017 |
| KR | 1020180074340 A | 7/2018 |

*Primary Examiner* — Austin Murata

(74) *Attorney, Agent, or Firm* — The Webb Law Firm

(57) ABSTRACT

In a method of manufacturing a cathode active material for a lithium secondary battery, a preliminary lithium metal oxide particle is prepared. The preliminary lithium metal oxide particle is cleaned using a boron compound cleaning solution. A cathode active material for a lithium secondary particle includes a lithium metal oxide particle where a ratio of a B+ peak intensity relative to a sum of peak intensities of Li+, B+ and LiB+ fragments by a TOF-SIMS analysis is in a range from 0.03% to 1.5%.

5 Claims, 3 Drawing Sheets

CATHODE ACTIVE MATERIAL FOR LITHIUM SECONDARY BATTERY AND METHOD OF MANUFACTURING THE SAME

CROSS-REFERENCE TO RELATED APPLICATIONS

This application is a continuation of U.S. patent application Ser. No. 17/014,314, filed Sep. 8, 2020, which claims priority to Korean Patent Application No. 10-2019-0111483, filed Sep. 9, 2019, the disclosures of which are hereby incorporated by reference in their entireties.

BACKGROUND

1. Field of the Invention

The present invention relates to a cathode active material for a lithium secondary battery and a method of manufacturing the same. More particularly, the present invention relates to a lithium metal oxide-based cathode active material for a lithium secondary battery and a method of manufacturing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly automobile such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (a separator), and an electrolyte immersing the electrode assembly. The lithium secondary battery may further include an outer case having, e.g., a pouch shape for accommodating the electrode assembly and the electrolyte.

A lithium metal oxide may be used as a cathode active material of the lithium secondary battery. An example of the lithium metal oxide may include a nickel-based lithium metal oxide.

As an application range of the lithium secondary battery is expanded, greater life-span, high capacity and operation stability are required. When a non-uniformity of a chemical structure occurs due to a lithium precipitation in the lithium metal oxide used as the cathode active material, the lithium secondary battery having desired capacity and life-span may not be obtained. Additionally, when the lithium metal oxide structure is deformed or damaged during repeated charging and discharging, life stability and capacity retention characteristics may be deteriorated.

For example, Korean Registered Patent Publication No. 10-0821523 discloses a method of removing lithium salt impurities by washing a lithium composite metal oxide with water. However, a sufficient impurity removal may not be implemented even by the method and a particle surface may be damaged by the washing process.

SUMMARY

According to an aspect of the present invention, there is provided a cathode active material for a lithium secondary battery having improved operational stability and electrical property, and a method of manufacturing the cathode active material.

According to an aspect of the present invention, there is provided a lithium secondary battery having improved operational stability and electrical property.

According to exemplary embodiments, in a method of manufacturing a cathode active material for a lithium secondary battery, a preliminary lithium metal oxide particle may be prepared. The preliminary lithium metal oxide particle may be cleaned using a boron compound cleaning solution.

In some embodiments, the boron compound cleaning solution may include boric acid ($H_3BO_3$).

In some embodiments, an amount of boric acid based on a total weight of the boron compound cleaning solution is in a range from 0.5 wt % to 5 wt %.

In some embodiments, the preliminary lithium metal oxide particle may be washed with water before the cleaning the preliminary lithium metal oxide particle.

In some embodiments, an active material cake may be formed by the washing.

In some embodiments, the cleaning the preliminary lithium metal oxide particle may include passing the boron compound cleaning solution through the active material cake without stirring.

In some embodiments, a weight ratio of the boron compound cleaning solution relative to a weight of the active material cake may be from 0.3 to 1.

In some embodiments, after the cleaning the preliminary lithium metal oxide particle, drying or thermally treating the preliminary lithium metal oxide particle may be further performed to convert the preliminary lithium metal oxide particle into a lithium metal oxide particle that contains a boron doping or a boron coating.

According to exemplary embodiments, a cathode active material for a lithium secondary battery includes a lithium metal oxide particle and a boron (B) element present on at least a portion of a surface of the lithium metal oxide particle. A ratio of a B+ peak intensity relative to a sum of peak intensities of Li+, B+ and LiB+ fragments by a TOF-SIMS (Time of Flight Secondary Ion Mass Spectrometry) analysis may be in a range from 0.03% to 1.5%.

In some embodiments, the ratio of the B+ peak intensity may be in a range from 0.3% to 1.4%.

In some embodiments, an amount of boron (B) based on a total weight of the lithium metal oxide particle may be in a range from 100 ppm to 800 ppm.

In some embodiments, the lithium metal oxide particle may include a lithium nickel-based metal oxide represented by Chemical Formula 1.

$$Li_xNi_yM_{1-y}O_2 \qquad \text{[Chemical Formula 1]}$$

In Chemical Formula 1, $0.95 < x < 1.08$, $0.5 \leq y < 1$, and M may include at least one element selected from the group consisting of Co, Mn, Al, Zr, Ti, B, Mg and Ba.

In some embodiments, $0.8 \leq y \leq 0.93$ in Chemical Formula 1.

In some embodiments, the lithium metal oxide particle may include a doping or a coating which may contain at least one of Al, Zr or Ti.

According to exemplary embodiments, a lithium secondary battery includes a cathode including a cathode active material according to embodiments as described above, an anode and a separation layer interposed between the cathode and the anode.

According to embodiments of the present invention, a lithium metal oxide may be washed using a cleaning solution containing a boron compound. Thus, for example, while forming a boron coating or a boron doping on a surface of the lithium metal oxide, impurities such as lithium salt precipitates may be removed. Accordingly, capacity and power may be enhanced by maintaining a high lithium content on the surface of the lithium metal oxide, and a life-span stability may be also improved through the boron coating or the boron doping.

In exemplary embodiments, boron may present in a predetermined content range on the surface of the lithium metal oxide, thereby improving structural and electrical stability of the lithium metal oxide while preventing an excessive decrease in capacity and efficiency.

DETAILED DESCRIPTION OF THE EMBODIMENTS

Cathode Active Material for Lithium Secondary Battery and Method of Manufacturing the Same Hereinafter, a cathode active material for a lithium secondary battery (hereinafter, abbreviated as a cathode active material) and a method of manufacturing the same are described together with reference to FIG. 1.

Figure 1:
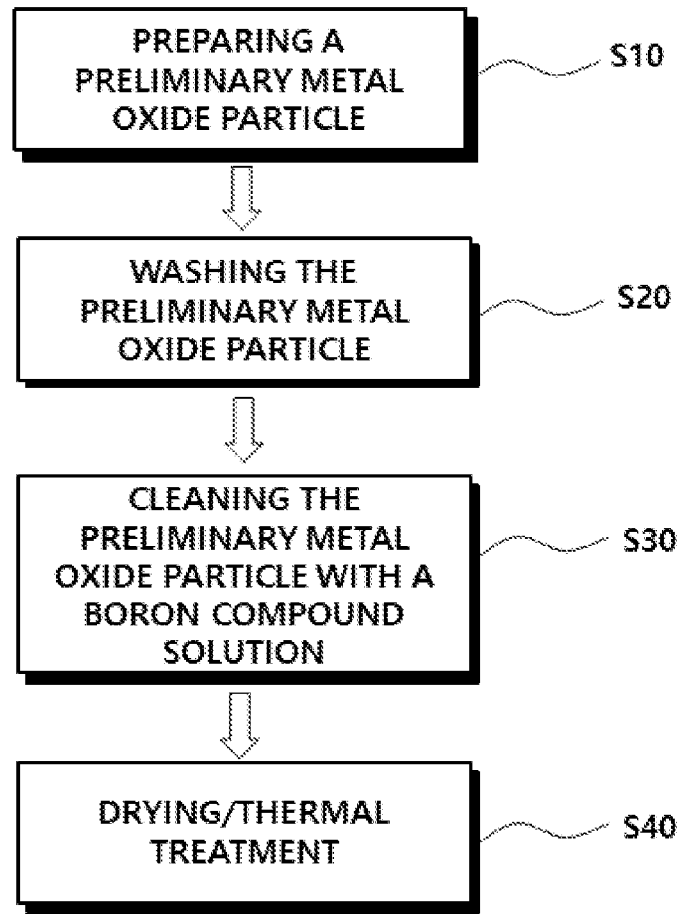
FIG. 1 is a process flow diagram schematically describing a method of manufacturing a cathode active material in accordance with exemplary embodiments.

Referring to FIG. 1, a preliminary lithium metal oxide particle may be prepared (e.g., an operation of S10).

The term "lithium metal oxide" used herein refers to a composite oxide including lithium and at least one metal other than lithium. In exemplary embodiments, the preliminary lithium metal oxide particle may include a lithium nickel-based metal oxide.

For example, the lithium nickel-based metal oxide may be represented by Chemical Formula 1 below.

$$Li_xNi_yM_{1-y}O_2 \qquad \text{[Chemical Formula 1]}$$

In Chemical Formula 1, $0.95 < x < 1.08$, $0.5 \leq y < 1$, and M may include at least one element selected from the group consisting of Co, Mn, Al, Zr, Ti, B, Mg and Ba.

Nickel (Ni) may serve as a metal related to a capacity of a lithium secondary battery. For example, as an amount of Ni becomes greater, the capacity and a power of the lithium secondary battery may be enhanced.

In an embodiment, in consideration of achieving high power and high capacity, $0.8 \leq y \leq 0.93$ in Chemical Formula 1.

M may include cobalt (Co) and manganese (Mn) to provide electrical and chemical stability when using a high-Ni composition. For example, cobalt (Co) may serve as a metal related to a conductivity or a resistance of the lithium secondary battery. In an embodiment, M may include manganese (Mn), and Mn may serve as a metal related to mechanical and electrical stability of the lithium secondary battery.

Accordingly, the preliminary lithium metal oxide particle may include a nickel-cobalt-manganese-based lithium oxide, and a cathode active material having improved capacity, power, low resistance and life-span stability may be provided.

In some embodiments, the preliminary lithium metal oxide particle may be prepared through a solution-based coprecipitation method. For example, a metal precursor solution including a metal precursor such as a nickel precursor, a manganese precursor, and a cobalt precursor may be prepared. The metal precursor may include, e.g., a halide, a hydroxide, or an acid salt of a metal.

The metal precursor solution may be reacted and stirred to form a precipitate. In an embodiment, the precipitate may be obtained by adding a chelating agent and a basic agent when mixing the metal precursor solution. After being heat-treated, a lithium salt may be mixed with the precipitate, and then fired or heat-treated to obtain the preliminary lithium metal oxide particle.

In some embodiments, the preliminary lithium metal oxide particle may be prepared by grinding, mixing and reacting a metal precursor and a lithium salt in solid forms.

The preliminary lithium metal oxide particle may further include a transition metal or an oxide thereof as a doping or a coating. For example, the doping or the coating may include Al, Zr, Ti or an oxide thereof.

In the nickel-cobalt-manganese-based lithium oxide, a content of the doping element may be in a range from about 0.1 mol % to about 1 mol % relative to a total molar number of Ni, Co, Mn and the doping element (e.g., Al, Zr and/or Ti), and preferably about 0.5 mol % to about 1 mol %. Within the above range, chemical and structural stability may be further improved without excessive deterioration of an activity of the cathode active material particle.

The coating may be derived from a coating metal oxide such as $Al_2O_3$, $ZrO_2$ and/or $TiO_2$. An amount of the coating metal oxide added for forming the coating may be in a range from about 0.5 weight percent (wt %) to about 1 wt % based on a total weight of the nickel-cobalt-manganese-based lithium oxide.

The doping or the coating may be formed through the heat treatment after mixing the preliminary lithium metal oxide particles prepared as described above with a powder of the transition metal or the transition metal oxide.

In some embodiments, e.g., in an operation of S20, the preliminary lithium metal oxide particles may be washed with water. For example, after water is added to the preliminary lithium metal oxide particles, a dough-shaped active material cake may be formed through a filtration.

Unreacted precursors remaining on a surface of the preliminary lithium metal oxide particle may be removed through the washing treatment, and process impurities may be preliminarily removed. The active material cake may have a substantially porous structure in which the preliminary lithium metal oxide particles may be physically agglomerated to form a flow path therein. Thus, a boron coating or a boron doping by a boron compound cleaning solution described below may be effectively implemented.

For example, in an operation of S30, the preliminary lithium metal oxide particle may be cleaned using a boron compound cleaning solution.

For example, the boron compound cleaning solution may be added to the active material cake obtained through the washing treatment using water to pass through pores or flow paths formed in the active material cake. Thus, a cleaning process may be easily performed without separately stirring or mixing the preliminary lithium metal oxide particles and the cleaning solution.

The boron compound cleaning solution may be formed by dissolving a boron compound in a cleaning solvent. In exemplary embodiments, water may be used as the cleaning solvent, and the boron compound may include boric acid ($H_3BO_3$). Boric acid may be easily dissolved in water, so that the cleaning solution may be easily formed even at room temperature, and re-precipitation in the solution may be prevented.

In an embodiment, a polar organic solvent such as an alcohol-based solvent may be used as the cleaning solvent.

In some embodiments, an amount of the boron compound based on a total weight of the cleaning solution may be in a range from about 0.5 wt % to about 5 wt %. Within the above range, a desired amount of the boron doping or the boron coating may be easily obtained through the cleaning process.

For example, if the weight of the boron compound exceeds about 5 wt %, a solubility of the boron compound may decrease, and thus uniform boron doping and coating may not be obtained. In a preferable embodiment, the amount of the boron compound based on the total weight of the cleaning solution may be from about 0.5 wt % to about to 4.5 wt %.

Impurities remaining on the surface of the preliminary lithium metal oxide particle may be removed through the cleaning process. For example, a lithium precursor (the lithium salt) may be used in an excessive amount to improve a yield of lithium metal oxide particles or to stabilize a synthesis process. In this case, lithium salt impurities including lithium hydroxide (LiOH) and lithium carbonate ($Li_2CO_3$) may remain on the surface of the preliminary lithium metal oxide particle.

If the lithium salt impurities are removed only by washing with water, the lithium salt impurities may be removed, but an oxidation of the surface of the lithium metal oxide particles and side reactions with water may be caused to result in a damage or a collapse of a layered structure of the cathode active material. Further, while the layered structure may be denatured into a spinel structure and/or a rock salt structure by water, a lithium-nickel oxide may be hydrolyzed to generate nickel impurities such as NiO or $Ni(OH)_2$.

However, according to exemplary embodiments, the cleaning solution containing the boron compound may be used, so that a passivation by boron may be implemented on the surface of the preliminary lithium metal oxide particle while the cleaning process is performed. Accordingly, the lithium salt impurities may be effectively removed while preventing the oxidation and damage to the layered structure by water on the particle surface.

Additionally, the cleaning solution may pass through the active material cake, so that an over-doping and an over-coating of boron occurring when the boron coating or doping is formed by dipping or stirring may be prevented.

In an embodiment, a weight ratio of the boron compound cleaning solution relative to a weight of the active material cake may be from about 0.3 to about 1.

After the cleaning process using the boron compound solution, in, e.g., an operation of S40, a cathode active material in the form of lithium metal oxide particles may be obtained through a drying and/or a heat treatment.

For example, the preliminary lithium metal oxide particles or the active material cake through which the cleaning process is performed may be dried for a predetermined time at a temperature from about 100° C. to about 150° C. in a vacuum atmosphere. Subsequently, the heat treatment may be performed using a sintering furnace, the lithium metal oxide particles on which the boron doping or the boron coating is fixed may be obtained.

A temperature of the heat treatment may be, e.g., from about 200° C. to about 300° C. For example, the temperature may be gradually increased to a target temperature at an increasing rate from about 1° C./min to 5° C./min. After reaching the target temperature, the preliminary lithium metal oxide particles may be maintained in the sintering furnace for a predetermined time.

The heat-treated lithium metal oxide particles may be classified using a mesh having a predetermined pore size to be used as the cathode electrode active material.

Boron elements may remain or may be fixed on the surface of the lithium metal oxide particle prepared as described above. When performing a Time of Flight Secondary Ion Mass Spectrometry (TOF-SIMS) on the lithium metal oxide particles, ions represented as $LixByOz^+$ ($x \geq 0$, $y \geq 0$ $z \geq 0$, and $x+y++z>0$) may be detected.

In the wet boron doping/coating process through the cleaning process according to exemplary embodiments, the cleaning solution may be flowed and pass through the active material cake. Thus, lithium inside the preliminary lithium metal oxide particle may be partially moved or transferred through a grain boundary by the cleaning solution. Therefore, a lithium ion ($Li^+$) content on the surface of the particle may be relatively increased so that a conductivity may be increased.

Further, when compared to a comparative example introducing the boron doping/coating by a dry heat treatment, a uniform and thin LBO phase may be formed on the surface of the particle using the wet process according to exemplary embodiments. Thus, a lithium amount on the surface of the particle may be relatively increased.

According to exemplary embodiments, a ratio of a peak intensity of B+ relative to a sum of peak intensities of Li+, B+ and LiB+ fragments by the TOF-SIMS analysis may be from about 0.03% to about 1.5%. Within this range, while improving a particle surface stabilization through the boron coating or doping and life-span properties of the lithium secondary battery, reduction in power and efficiency due to the over-doping or overcoating may be prevented or avoided.

Preferably, the ratio of the B+ peak intensity may be from about 0.3% to about 1.4%.

In some embodiments, an amount of boron (B) based on a weight of the lithium metal oxide particle may be from about 100 ppm to about 800 ppm.

Lithium Secondary Battery

Figure 2:
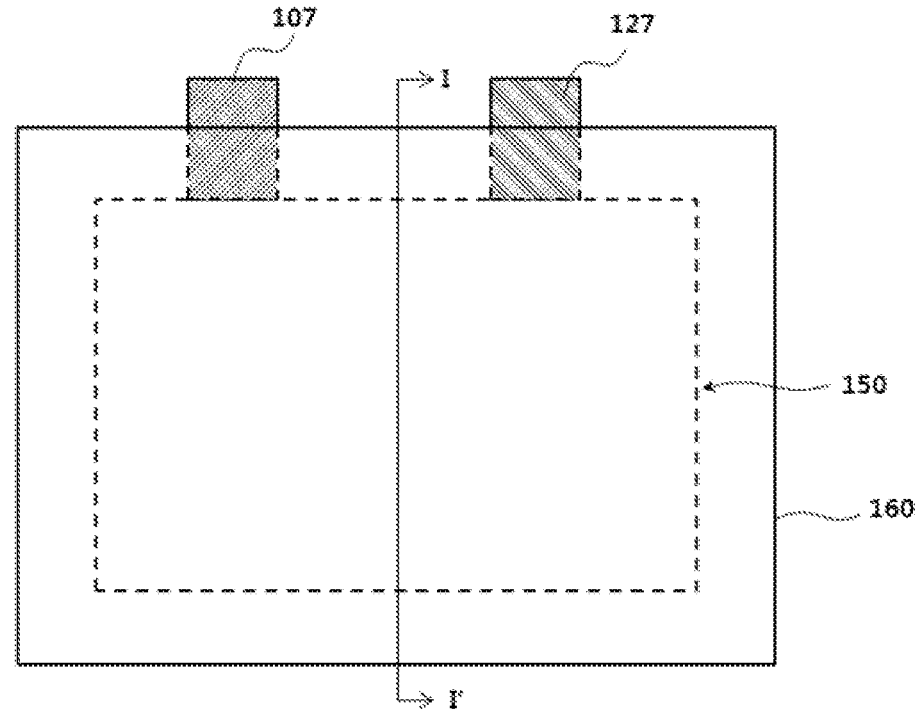
FIGS. 2 and 3 are a schematic top planar view and a schematic cross-sectional view, respectively, illustrating a lithium secondary battery in accordance with exemplary embodiments.
Figure 3:
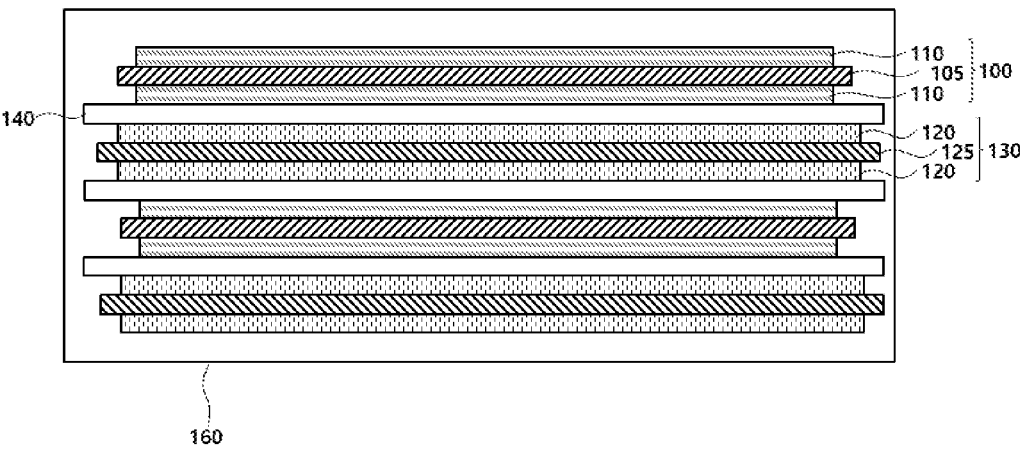

FIGS. 2 and 3 are a schematic top planar view and a schematic cross-sectional view, respectively, illustrating a lithium secondary battery in accordance with exemplary embodiments.

Referring to FIGS. 2 and 3, a lithium secondary battery may include a cathode 100 including a cathode active material that contains the above-described boron component on a surface thereof, an anode 130 and a separation layer 140

The cathode 100 may include a cathode active material layer 110 formed by coating a cathode active material that may include the lithium metal oxide particles as described above on a cathode current collector 105.

For example, the lithium metal oxide particles cleaned using the boron compound solution may be mixed and stirred together with a binder, a conductive agent and/or a dispersive additive in a solvent to form a slurry. The slurry may be coated on the cathode current collector 105, and pressed and dried to form the cathode.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be improved.

The conductive agent may be added to facilitate electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium or indium.

The anode current collector 125 may include gold, stainless-steel, nickel, aluminum, titanium, copper or an alloy thereof, preferably, may include copper or a copper alloy.

In some embodiments, an anode active material may be mixed and stirred together with a binder, a conductive agent and/or a dispersive additive in a solvent to form a slurry. The slurry may be coated on the anode current collector, and pressed and dried to form the anode 130.

The binder and the conductive agent substantially the same as or similar to those for the cathode 100 as mentioned above may be used. In some embodiments, the binder for the anode may include an aqueous binder such as such as styrene-butadiene rubber (SBR) that may be used with a thickener such as carboxymethyl cellulose (CMC) so that compatibility with a carbon-based active material may be improved.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly may be accommodated in an outer case 160 together with an electrolyte. In exemplary embodiments, the electrolyte may include non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, electrode tabs (a cathode tab and an anode tab) may protrude from the cathode current collector 105 and the anode electrode current collector 125 included in each electrode cell to one side of the outer case 160. The electrode tabs may be fused together with the one side of the outer case 160 to form an electrode lead (a cathode lead 107 and an anode 127) extending or exposed to an outside of the outer case 160.

The lithium secondary battery may be manufactured in, e.g., a cylindrical shape using a can, a square shape, a pouch shape or a coin shape.

According to exemplary embodiments, chemical stability of the cathode active material may be improved by the boron doping or the boron coating. Thus, a lithium secondary battery having improved life-span and long-term stability while suppressing a reduction in capacity and average voltage may be implemented.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims

EXAMPLES AND COMPARATIVE EXAMPLES

In Examples and Comparative Examples, a lithium metal oxide particle having a composition of $Li[Ni_{0.83}Co_{0.11}Mn_{0.06}]O_2$ or the lithium metal oxides including a doping of Al, Zr and Ti or a coating of $Al_2O_3$, $ZrO_2$ and $TiO_2$ as shown in Table 1 were used. De-ionized water (DIW) having a specific resistance of 25MΩcm or less was used in washing and cleaning processes.

Examples 50 g of the preliminary lithium metal oxide particle as shown in Table 1 was input in 50 ml of pure water, stirred for 10 minutes and then vacuum filtrated using Buchner funnel to form an active material cake. Boric acid ($H_3BO_3$) was dissolved in pure water by a concentration (wt %) as shown in Table 1 to prepare a cleaning solution. 50 ml of the cleaning solution was input into the active material cake to pass therethrough without additional stirring and mixing The active material cake cleaned by the boron solution was dried in a vacuum state at a temperature of 100-150° C. for 12 hours. The dried particles were input in a sintering furnace. A temperature was raised at a rate of 2° C./min to a temperature between 200° C. and 300° C. while providing oxygen at a flow rate of 10 mL/min, and the raised temperature was maintained for 10 hours. After the sintering, the particles were classified using 325 mesh to obtain lithium metal oxide particles as a cathode active material.

Comparative Examples 1-1 to 1-3

An active material cake was formed by the same method as that of Examples, and then 50 ml of pure water was input through the active material cake. Subsequently, processes the same as those of Examples were performed to obtain the lithium metal oxide particles.

Comparative Examples 2-1 to 2-4

An active material cake was formed by the same method as that of Examples, and then cleaned by inputting 50 ml of pure water through the active material cake. The cleaned active material cake was dried in a vacuum state at a temperature of 100-150° C. for 12 hours. The dried particles were mixed with $H_3BO_3$ powder by an amount as shown in Table 1, and sintered by the same method as that of Examples to obtain the lithium metal oxide particles.

TABLE 1

| | | Doping Amount (mol %) | | | Coating Amount (wt %) | | | $H_3BO_3$ concentration in cleaning solution (wt %) | $H_3BO_3$ powder amount (wt %) |
|---|---|---|---|---|---|---|---|---|---|
| | Cathode Composition | Al | Zr | Ti | $Al_2O_3$ | $ZrO_2$ | $TiO_2$ | $H_3BO_3$ in DIW | $H_3BO_3$ |
| Example 1-1 | Li[Ni$_{0.83}$Co$_{0.11}$Mn$_{0.06}$]O$_2$ | — | | | | | | 2.3 | — |
| Example 1-2 | Li[Ni$_{0.83}$Co$_{0.11}$Mn$_{0.06}$]O$_2$ | 0.3 | 0.2 | 0.2 | | | | 2.3 | — |
| Example 1-3 | Li[Ni$_{0.83}$Co$_{0.11}$Mn$_{0.06}$]O$_2$ | | | | 0.5 | 0.06 | 0.2 | 2.3 | — |
| Example 2-1 | Li[Ni$_{0.83}$Co$_{0.11}$Mn$_{0.06}$]O$_2$ | | | | 0.5 | 0.06 | 0.2 | 0.6 | — |
| Example 2-2 | Li[Ni$_{0.83}$Co$_{0.11}$Mn$_{0.06}$]O$_2$ | | | | 0.5 | 0.06 | 0.2 | 1.1 | — |
| Example 2-3 | Li[Ni$_{0.83}$Co$_{0.11}$Mn$_{0.06}$]O$_2$ | | | | 0.5 | 0.06 | 0.2 | 4.4 | — |
| Comparative Example 1-1 | Li[Ni$_{0.83}$Co$_{0.11}$Mn$_{0.06}$]O$_2$ | | | | | | | — | — |
| Comparative Example 1-2 | Li[Ni$_{0.83}$Co$_{0.11}$Mn$_{0.06}$]O$_2$ | 0.3 | 0.2 | 0.2 | | | | — | — |
| Comparative Example 1-3 | Li[Ni$_{0.83}$Co$_{0.11}$Mn$_{0.06}$]O$_2$ | | | | 0.5 | 0.06 | 0.2 | — | — |
| Comparative Example 2-1 | Li[Ni$_{0.83}$Co$_{0.11}$Mn$_{0.06}$]O$_2$ | | | | 0.5 | 0.06 | 0.2 | — | 0.06 wt % |
| Comparative Example 2-2 | Li[Ni$_{0.83}$Co$_{0.11}$Mn$_{0.06}$]O$_2$ | | | | 0.5 | 0.06 | 0.2 | — | 0.12 wt % |
| Comparative Example 2-3 | Li[Ni$_{0.83}$Co$_{0.11}$Mn$_{0.06}$]O$_2$ | | | | 0.5 | 0.06 | 0.2 | — | 0.23 wt % |
| Comparative Example 2-4 | Li[Ni$_{0.83}$Co$_{0.11}$Mn$_{0.06}$]O$_2$ | | | | 0.5 | 0.06 | 0.2 | — | 0.46 wt % |

Experimental Example (1) TOF-SIMS Analysis

TOF-SIMS analysis was performed with respect to each cathode active material of Examples and Comparative Examples. An absolute value of a peak intensity of each $Li+$, $B+$ and $LiB+$ from a surface of each cathode active material was measured, and then a peak intensity ratio of each component was calculated. The results are shown in Table 2 below.

TABLE 2

| | TOF-SIMS fragment peak intensity (absolute value) | | | Ratios of TOF-SIMS fragment peak intensity | | |
|---|---|---|---|---|---|---|
| | $Li^+$ | $B^+$ | $LiB^+$ | $Li^+$ | $B^+$ | $LiB^+$ |
| Example 1-1 | 17247815 | 115786 | 2529 | 99.319% | 0.667% | 0.015% |
| Example 1-2 | 17402034 | 123055 | 2446 | 99.284% | 0.702% | 0.014% |
| Example 1-3 | 17622460 | 128888 | 1553 | 99.265% | 0.726% | 0.009% |
| Example 2-1 | 11161977 | 13150 | 316 | 99.880% | 0.118% | 0.003% |

TABLE 2-continued

| | TOF-SIMS fragment peak intensity (absolute value) | | | Ratios of TOF-SIMS fragment peak intensity | | |
|---|---|---|---|---|---|---|
| | $Li^+$ | $B^+$ | $LiB^+$ | $Li^+$ | $B^+$ | $LiB^+$ |
| Example 2-2 | 17567242 | 67208 | 1974 | 99.608% | 0.381% | 0.011% |
| Example 2-3 | 17853414 | 237550 | 3122 | 98.670% | 1.313% | 0.017% |
| Comparative Example 1-1 | 12832942 | 643 | 12 | 99.995% | 0.005% | 0.000% |
| Comparative Example 1-2 | 10706056 | 838 | 32 | 99.992% | 0.008% | 0.000% |
| Comparative Example 1-3 | 17544491 | 5059 | 151 | 99.970% | 0.029% | 0.001% |
| Comparative Example 2-1 | 17909925 | 296153 | 4607 | 98.348% | 1.626% | 0.025% |
| Comparative Example 2-2 | 17273597 | 330603 | 4471 | 98.097% | 1.878% | 0.025% |
| Comparative Example 2-3 | 17648910 | 378928 | 4311 | 97.875% | 2.101% | 0.024% |
| Comparative Example 2-4 | 17332083 | 463371 | 5872 | 97.364% | 2.603% | 0.033% |

(2) Measurement of Lithium Salt Impurities 5.0 g of each lithium metal oxide particle according to Examples and Comparative Examples was quantified in a 250 mL flask with 100 g of deionized water, and then a magnetic bar was put and stirred for 10 minutes at a rate of 4 rpm. The mixture was filtered using a pressure reducing flask and 50 g of the mixture was collected. The collected mixture was automatically titrated with 0.1N HCl in an auto titrator to measure amounts of LiOH and $Li_2CO_3$ as shown in Table 3 below.

(3) Measurement of Boron Amount

To calculate a content (ppm) of boron (B) relative to the lithium metal oxide particle, samples were pre-treated by an acid decomposition method. Specifically, after the lithium metal oxide particles of Examples and Comparative Examples were added to a hydrochloric acid solution, the samples were decomposed by heating and diluted 1/1000 times. The boron (B) content (ppm) was measured using ICP-OES (Optima 8300, PerkinElmer) from the diluted solution.

(4) Evaluation of Battery Properties 4-1) Fabrication of Secondary Battery Cell

Each lithium metal oxide particles of Examples and Comparative Examples, carbon black as a conductive additive and PVDF as a binder were mixed by a weight ratio of 92:5:3 to form a slurry. The slurry was uniformly coated on an aluminum foil having a thickness of 15 m and vacuum-dried at 130° C. to form a cathode for a lithium secondary battery. An electrode assembly was formed using the cathode, a lithium foil as a counter electrode, a porous polyethylene layer (thickness: 21 μm) as a separator. A battery cell having a coin half cell shape was fabricated by a commonly known process using the electrode assembly and an electrolyte solution in which 1.0 M of $LiPF_6$ was dissolved in a solution including ethylene carbonate and ethyl methyl carbonate by a volume ratio of 3:7, and then evaluated in a voltage range from 3.0 V to 4.3 V.

4-2) Measurement of Initial Charging/Discharging Capacity

One cycle of a charging (CC/CV 0.1 C 4.3V 0.005 C CUT-OFF) and a discharging (CC 0.1 C 3.0V CUT-OFF) was performed to the battery cells of Examples and Comparative Examples, and initial charging and discharging capacities were measured (CC: constant current, CV: constant voltage).

4-3) Measurement of Initial Efficiency

The initial discharging capacity measured in the above 4-2) was denominated by the initial charging capacity to measure an initial efficiency as a percentage value.

4-4) Evaluation of Rate Property

One cycle of a charging (CC/CV 0.1 C 4.3V 0.005 C CUT-OFF) and a discharging (CC 0.1 C 3.0V CUT-OFF) to the battery cells according to Examples and Comparative Examples was performed, and then a charging (CC/CV 0.5 C 4.3V 0.005 C CUT-OFF) and a discharging (CC 4.0 C 3.0V CUT-OFF) were performed once again. The rate property was evaluated by dividing the 4.0 C discharge capacity by the 0.1 C discharge capacity as a percentage value.

4-5) Evaluation of Capacity Retention (Life-Span Property)

200 cycles of a charging (CC/CV 0.5 C 4.3V 0.05 CA CUT-OFF) and a discharging (CC 1.0 C 3.0V CUT-OFF) were repeated using the battery cells of Examples and Comparative Examples. A discharging capacity at the 200th cycle was denominated by the discharging capacity at the first cycle to measure a capacity retention ratio as a percentage value.

The results are shown in Table 3 below.

TABLE 3

| | LiOH (wt %) | $Li_2CO_3$ (wt %) | B content (ppm) | Initial Charging Capacity (mAh/g) | Initial Discharging Capacity (mAh/g) | Initial Efficiency | Rate property | Capacity Retention |
|---|---|---|---|---|---|---|---|---|
| Example 1-1 | 0.114 | 0.177 | 420 | 224 | 203 | 90.6% | 83.1% | 88% |
| Example 1-2 | 0.134 | 0.159 | 400 | 225 | 202 | 89.8% | 83.6% | 87% |
| Example 1-3 | 0.120 | 0.164 | 410 | 225 | 203 | 90.2% | 82.7% | 92% |
| Example 2-1 | 0.142 | 0.151 | 100 | 223 | 202 | 90.6% | 84.7% | 84% |
| Example 2-2 | 0.145 | 0.163 | 210 | 224 | 202 | 90.2% | 83.2% | 90% |
| Example 2-3 | 0.110 | 0.180 | 760 | 223 | 201 | 90.1% | 82.7% | 91% |
| Comparative | 0.142 | 0.163 | 0 | 225 | 205 | 91.1% | 85.2% | 66% |

TABLE 3-continued

| | LiOH (wt %) | Li$_2$CO$_3$ (wt %) | B content (ppm) | Initial Charging Capacity (mAh/g) | Initial Discharging Capacity (mAh/g) | Initial Efficiency | Rate property | Capacity Retention |
|---|---|---|---|---|---|---|---|---|
| Example 1-1 Comparative Example 1-2 | 0.130 | 0.172 | 0 | 224 | 204 | 91.1% | 84.8% | 69% |
| Comparative Example 1-3 | 0.131 | 0.154 | 0 | 225 | 203 | 90.2% | 84.4% | 72% |
| Comparative Example 2-1 | 0.195 | 0.146 | 100 | 224 | 199 | 88.8% | 82.9% | 86% |
| Comparative Example 2-2 | 0.178 | 0.153 | 200 | 225 | 199 | 88.4% | 81.2% | 91% |
| Comparative Example 2-3 | 0.208 | 0.131 | 390 | 225 | 198 | 88.0% | 81.0% | 91% |
| Comparative Example 2-4 | 0.201 | 0.143 | 800 | 224 | 196 | 87.5% | 79.5% | 90% |

Referring to Table 2 and Table 3, in Examples employing boron by a wet process, the lithium salt impurities were reduced compared to those in Comparative Examples while achieving improved charging/discharging efficiency and capacity retention.

In Comparative Examples 1-1 to 1-3 to which boron was not introduced, the capacity retention was drastically decreased. In Comparative Examples 2-1 to 2-4 to which boron was introduced by a dry coating, the initial charging/discharging efficiency and the rate property were degraded compared to those from Examples.

Figure 4:
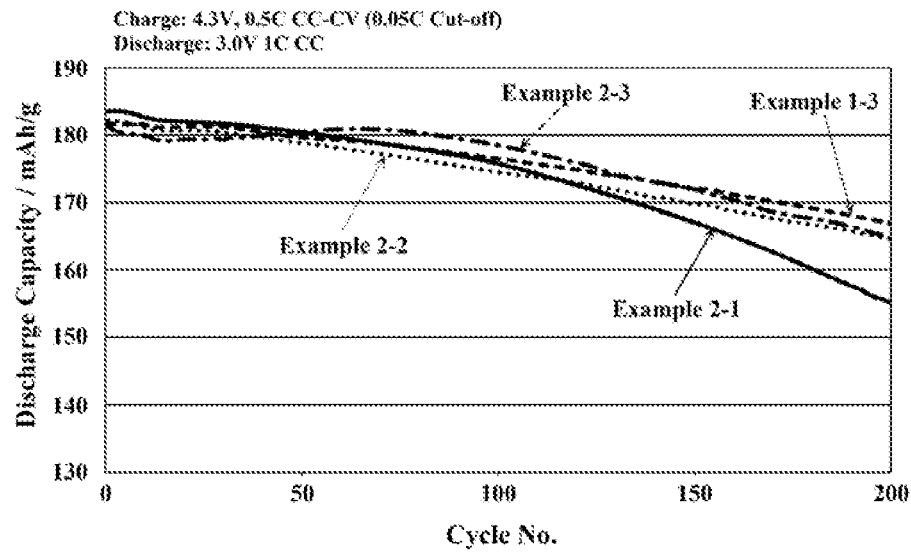
FIGS. 4 and 5 are graphs showing electrochemical properties of a lithium secondary battery including lithium metal oxides of Examples.
Figure 5:
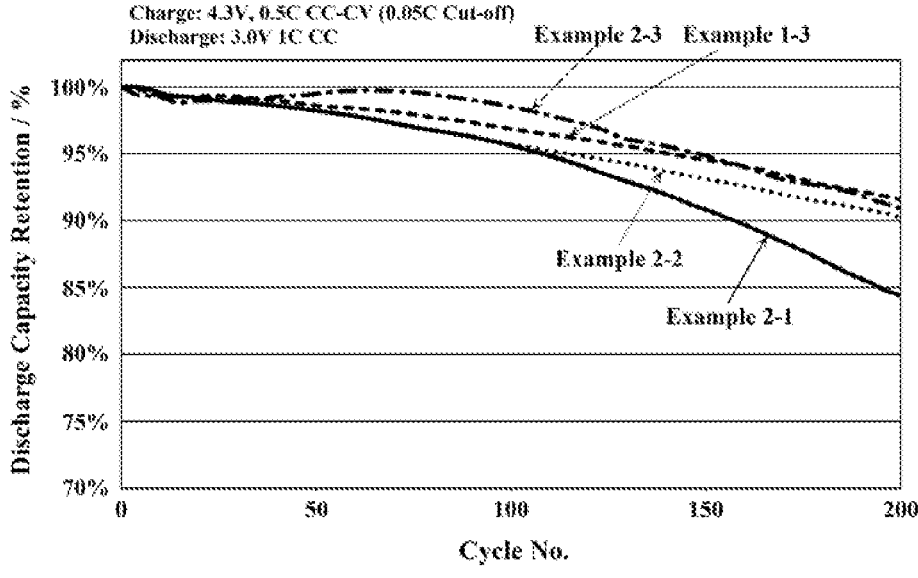

FIGS. 4 and 5 are graphs showing electrochemical properties of a lithium secondary battery including lithium metal oxides of Examples.

Specifically, FIG. 4 is a graph showing a capacity change when 200 cycles of charging and discharging were performed in Examples 1-3, 2-1, 2-2 and 2-3. FIG. 5 is a graph showing capacity retentions when 200 cycles of charging and discharging were performed in Examples 1-3, 2-1, 2-2 and 2-3.

Referring to FIGS. 4 and 5, substantially constant capacity properties were provided until about 100 cycles. However, in Example 2-1 having a relatively low B+ intensity ratio, the capacity after 150th cycle was slightly decreased.

What is claimed is:

1. A cathode active material for a lithium secondary battery, comprising:

a lithium metal oxide particle; and a boron (B) element present on at least a portion of a surface of the lithium metal oxide particle, wherein a ratio of a B+ peak intensity relative to a sum of peak intensities of Li+, B+ and LiB+ fragments by a TOF-SIMS (Time of Flight Secondary Ion Mass Spectrometry) analysis is in a range from 0.03% to 1.5%, wherein the lithium metal oxide particle includes Ni, Mn, and Co and a molar ratio of Ni among Ni, Mn, and Co is greater than or equal to 0.5 and less than 1.

2. The cathode active material for a lithium secondary battery according to claim 1, wherein the ratio of the B+ peak intensity is in a range from 0.3% to 1.4%.

3. The cathode active material for a lithium secondary battery according to claim 1, wherein an amount of boron (B) based on a total weight of the lithium metal oxide particle is in a range from 100 ppm to 800 ppm.

4. The cathode active material for a lithium secondary battery according to claim 1, wherein the lithium metal oxide particle includes a doping or a coating which contains at least one of Al, Zr or Ti.

5. A lithium secondary battery, comprising:

a cathode including a cathode active material according to claim 1;

an anode; and a separation layer interposed between the cathode and the anode.

* * * * *